United States Patent
Saigo et al.

(10) Patent No.: US 9,641,829 B2
(45) Date of Patent: May 2, 2017

(54) IMAGE DISPLAY APPARATUS

(71) Applicant: Panasonic Intellectual Property Management Co., Ltd., Osaka (JP)

(72) Inventors: Katsuo Saigo, Hyogo (JP); Hiroshi Mitani, Osaka (JP); Kei Tasaka, Osaka (JP); Kazuo Okamoto, Osaka (JP); Shuji Inoue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 76 days.

(21) Appl. No.: 14/711,150

(22) Filed: May 13, 2015

(65) Prior Publication Data
US 2015/0249820 A1  Sep. 3, 2015

Related U.S. Application Data

(63) Continuation of application No. PCT/JP2014/000605, filed on Feb. 5, 2014.

(30) Foreign Application Priority Data

Feb. 19, 2013 (JP) .................. 2013-029610

(51) Int. Cl.
*G02B 3/00* (2006.01)
*G02B 27/22* (2006.01)
(Continued)

(52) U.S. Cl.
CPC ....... *H04N 13/0486* (2013.01); *G02B 6/0053* (2013.01); *G02B 6/0068* (2013.01);
(Continued)

(58) Field of Classification Search
CPC .............. G02B 27/2214; G02B 27/225; H04N 13/0402; H04N 13/0409; H04N 13/0411; H04N 13/0486
See application file for complete search history.

(56) References Cited

U.S. PATENT DOCUMENTS 5,917,562 A * 6/1999 Woodgate .............. G02B 27/26
                                                  348/E13.022
6,061,179 A * 5/2000 Inoguchi ............ G02B 27/2214
                                                  348/59
(Continued)

FOREIGN PATENT DOCUMENTS

JP   11-133887 A   5/1999
JP   2005-266293 A   9/2005
(Continued)

OTHER PUBLICATIONS

International Search Report issued in PCT/JP2014/000605, dated Mar. 11, 2014, with English translation.

*Primary Examiner* — Michael J Eurice
(74) *Attorney, Agent, or Firm* — McDermott Will & Emery LLP

(57) ABSTRACT

An image display apparatus includes: a first light source; a second light source; a deflection unit for deflecting the light emitted from the first light source toward a viewing position of the first image and deflecting the light emitted from the second light source toward a viewing position of the second image; and a spatial light modulator that has a plurality of pixels each of which includes a plurality of subpixels, and modulates the light having passed through the deflection unit on the basis of a first image signal and a second image signal. Each of subpixels is formed in a shape where the length in the first direction, which is substantially parallel with the line connecting the viewing position of the first image to the viewing position of the second image, is longer than or equal to the length in the second direction orthogonal to the first direction.

5 Claims, 13 Drawing Sheets

(51) Int. Cl.
*H04N 13/04* (2006.01)
*H04N 13/00* (2006.01)
*F21V 8/00* (2006.01)

(52) U.S. Cl.
CPC ..... *G02B 27/2214* (2013.01); *H04N 13/0033* (2013.01); *H04N 13/0402* (2013.01); *H04N 13/0406* (2013.01); *H04N 13/0418* (2013.01); *G02B 27/225* (2013.01); *H04N 13/0404* (2013.01); *H04N 13/0409* (2013.01); *H04N 13/0411* (2013.01); *H04N 13/0422* (2013.01)

(56) References Cited

U.S. PATENT DOCUMENTS

| | | | | |
|---|---|---|---|---|
| 6,118,584 A * | 9/2000 | Van Berkel | ........ | H04N 13/0404 348/54 |
| 6,124,920 A * | 9/2000 | Moseley | ........... | G02B 27/2214 348/E13.004 |
| 6,160,527 A * | 12/2000 | Morishima | ........ | G02B 27/2214 345/32 |
| 6,246,451 B1 * | 6/2001 | Matsumura | ........ | G02B 27/2214 348/59 |
| 6,326,981 B1 | 12/2001 | Mori et al. | | |
| 2002/0054430 A1 * | 5/2002 | Takikawa | ........... | H04N 13/0404 359/462 |
| 2002/0113866 A1 * | 8/2002 | Taniguchi | ........ | G02B 27/2214 348/51 |
| 2002/0154257 A1 * | 10/2002 | Iijima | ............... | G02F 1/133514 349/67 |
| 2004/0169919 A1 | 9/2004 | Uehara et al. | | |
| 2004/0240777 A1 * | 12/2004 | Woodgate | .......... | G02B 27/2214 385/16 |
| 2006/0098296 A1 * | 5/2006 | Woodgate | .......... | G02B 27/2214 359/642 |
| 2006/0238545 A1 * | 10/2006 | Bakin | ................ | G02B 27/2214 345/613 |
| 2007/0013624 A1 * | 1/2007 | Bourhill | ................. | B82Y 20/00 345/84 |
| 2007/0019291 A1 | 1/2007 | Nam et al. | | |
| 2007/0086090 A1 | 4/2007 | Wang et al. | | |
| 2007/0103547 A1 | 5/2007 | Kim et al. | | |
| 2008/0094700 A1 * | 4/2008 | Uehara | ................ | G02B 3/0025 359/463 |
| 2008/0117231 A1 * | 5/2008 | Kimpe | ..................... | G09G 3/20 345/629 |
| 2008/0246837 A1 * | 10/2008 | Schultz | .............. | H04N 13/0404 348/51 |
| 2008/0285306 A1 * | 11/2008 | Sugihara | ................ | B60K 35/00 362/617 |
| 2009/0167639 A1 * | 7/2009 | Casner | ............... | G02B 27/2214 345/58 |
| 2009/0179893 A1 | 7/2009 | Nakamura | | |
| 2009/0243971 A1 * | 10/2009 | Uehara | .................. | G02F 1/1323 345/32 |
| 2010/0156773 A1 | 6/2010 | Uehara et al. | | |
| 2010/0165221 A1 * | 7/2010 | Krijn | .................. | G02B 27/2214 349/15 |
| 2010/0177093 A1 | 7/2010 | Uehara et al. | | |
| 2011/0157169 A1 * | 6/2011 | Bennett | ..................... | G06F 3/14 345/419 |
| 2011/0188106 A1 * | 8/2011 | Bae | ........................ | G02B 26/08 359/226.3 |
| 2011/0234929 A1 | 9/2011 | Lin | | |
| 2011/0255170 A1 * | 10/2011 | Yamada | ................ | G02B 5/0236 359/619 |
| 2011/0304601 A1 * | 12/2011 | Niioka | ............... | G02B 27/2214 345/209 |
| 2012/0013651 A1 * | 1/2012 | Trayner | ................... | G02B 5/32 345/690 |
| 2012/0113153 A1 * | 5/2012 | Casner | ............... | G02B 27/2214 345/690 |
| 2012/0120213 A1 * | 5/2012 | Ohyama | ........... | H04N 13/0415 348/60 |
| 2012/0162762 A1 * | 6/2012 | Takahashi | .......... | G02B 27/2214 359/462 |
| 2012/0169964 A1 * | 7/2012 | Ohyama | ................ | G02B 27/26 349/62 |
| 2012/0218325 A1 * | 8/2012 | Hiroki | .................... | G09G 3/003 345/697 |
| 2012/0242568 A1 * | 9/2012 | Kim | .................. | G02B 27/2214 345/156 |
| 2013/0063327 A1 | 3/2013 | Nakahata et al. | | |
| 2013/0201417 A1 | 8/2013 | Murao et al. | | |
| 2014/0029094 A1 * | 1/2014 | Kroon | .................. | G09G 3/3208 359/463 |
| 2014/0192047 A1 * | 7/2014 | Mishima | ........... | H04N 13/0404 345/419 |
| 2015/0035873 A1 * | 2/2015 | Shima | ................ | G02B 27/2214 345/690 |
| 2015/0301402 A1 * | 10/2015 | Kimura | ............ | G02F 1/133512 349/69 |

FOREIGN PATENT DOCUMENTS

| | | |
|---|---|---|
| JP | 2006-010935 A | 1/2006 |
| JP | 2007-011254 A | 1/2007 |
| JP | 2010-109414 A | 5/2010 |
| JP | 2011-197676 A | 10/2011 |
| JP | 2012-198364 A | 10/2012 |
| WO | 2012-050036 A1 | 4/2012 |
| WO | 2013-157341 A1 | 10/2013 |

* cited by examiner

FIG. 1
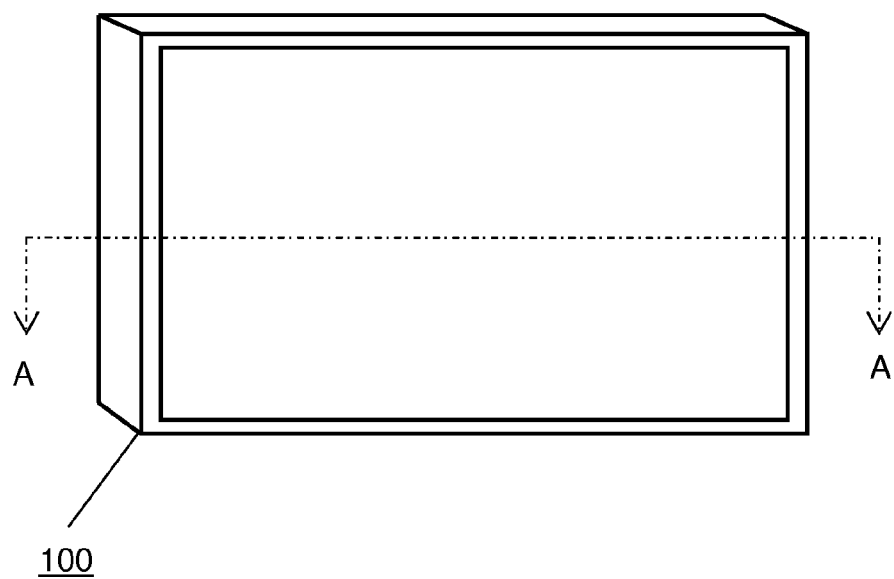
100
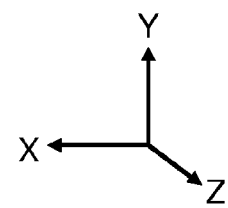

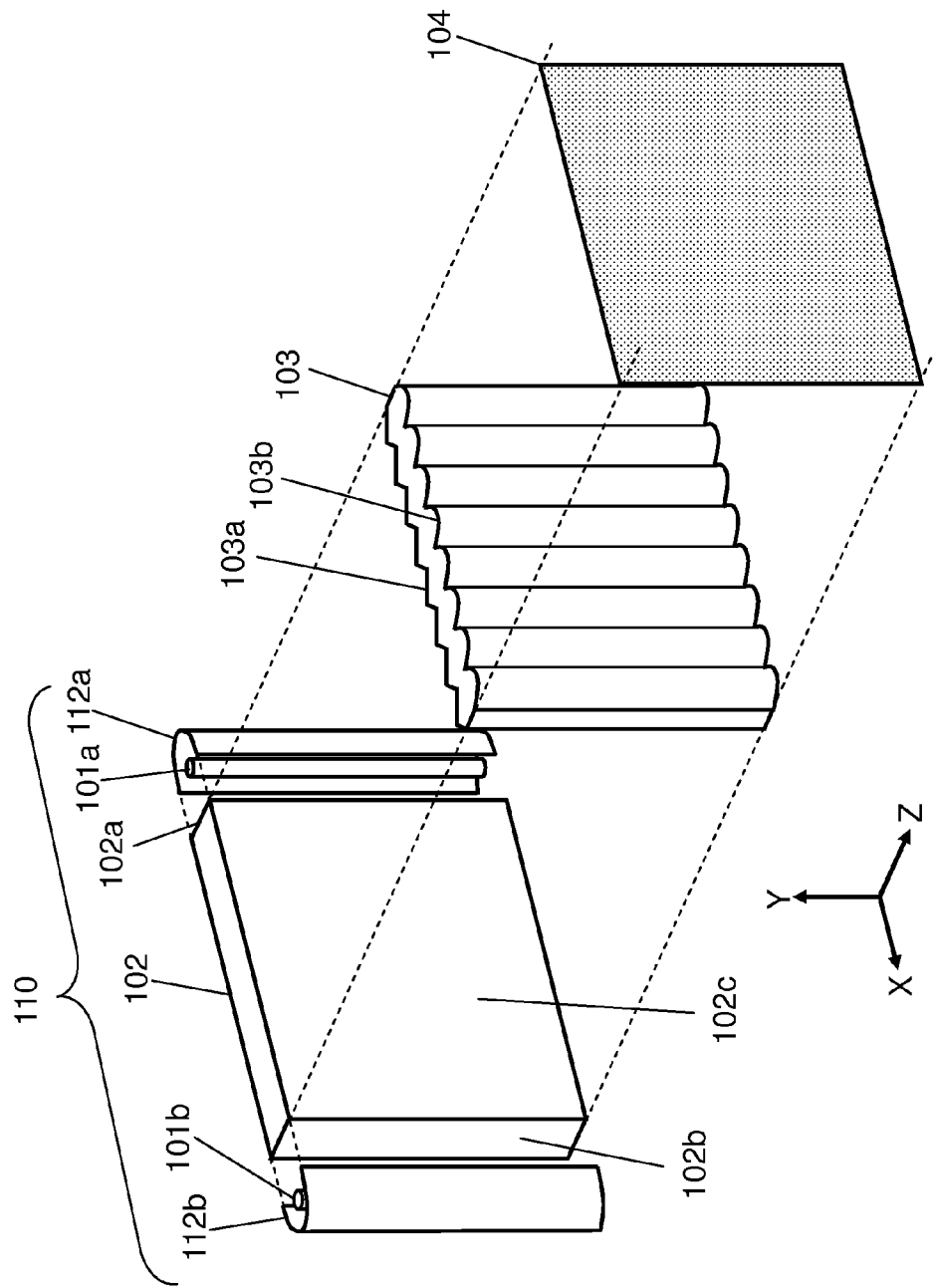

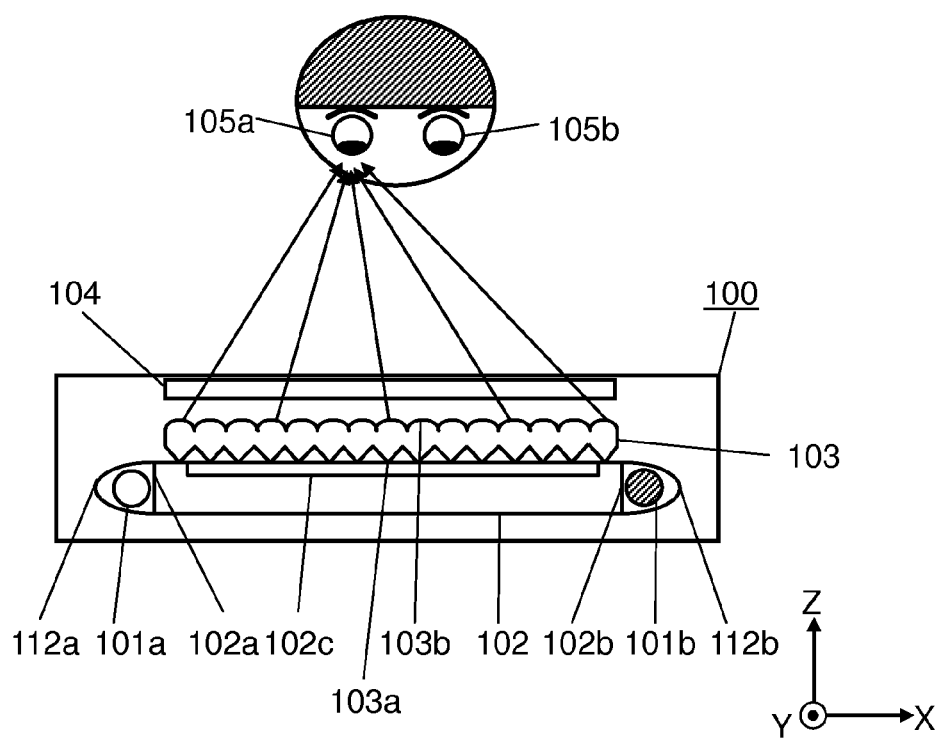
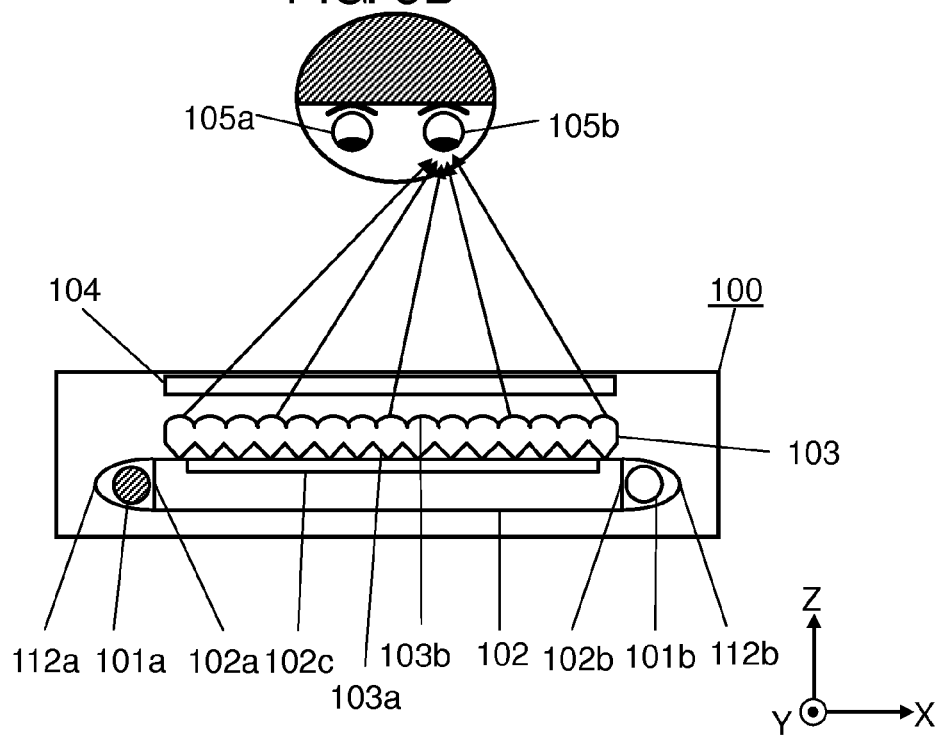

FIG. 5A
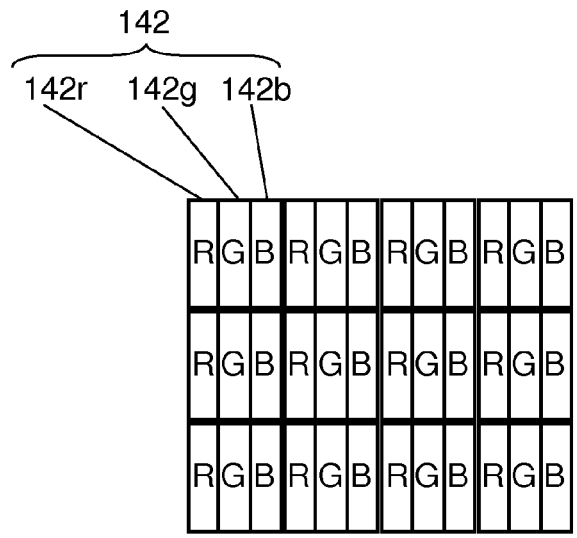
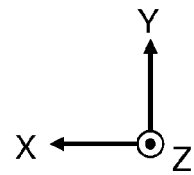
FIG. 5B
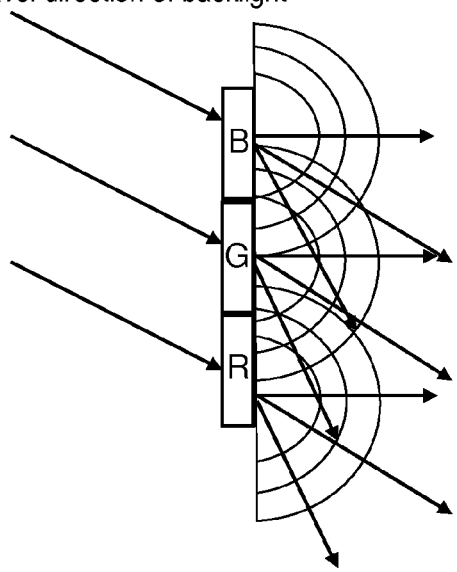
Travel direction of backlight
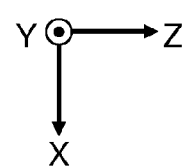

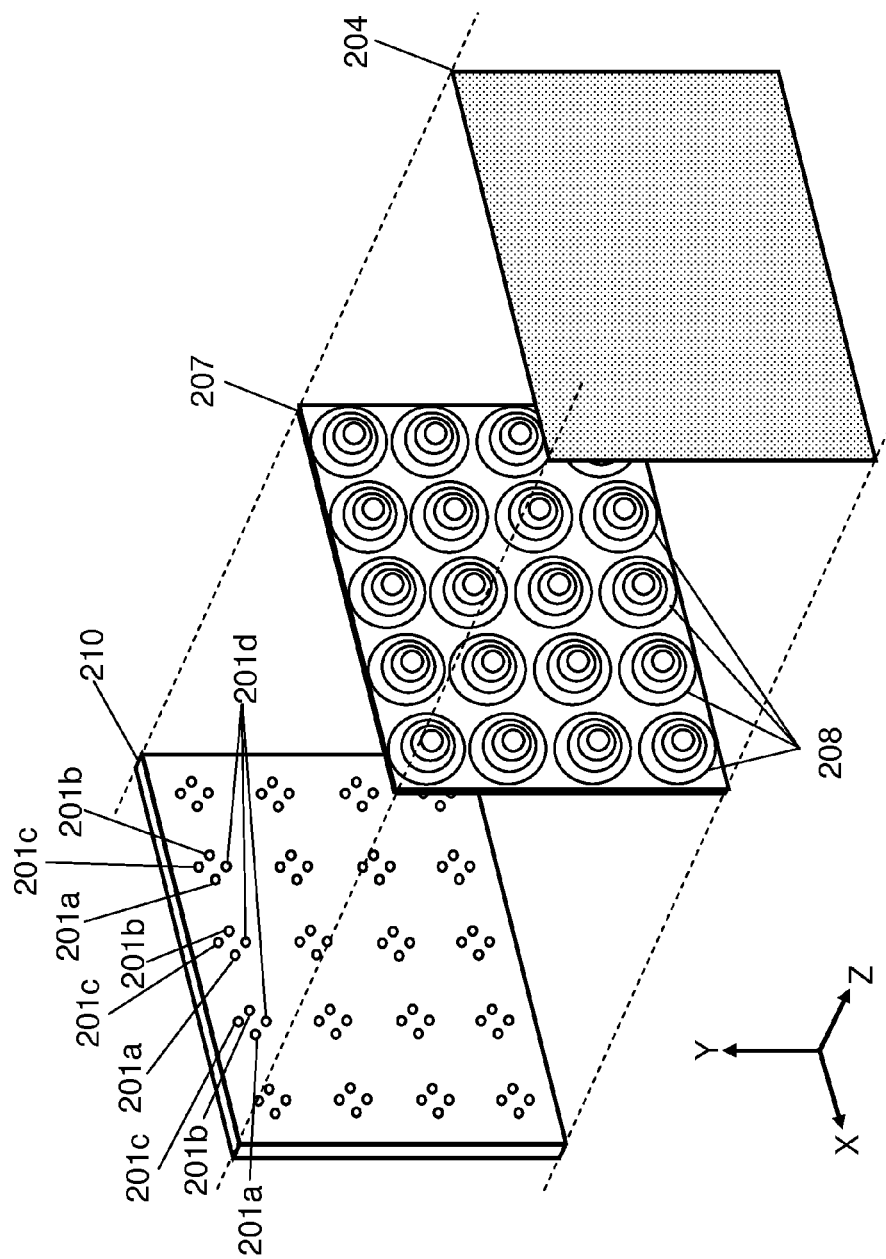

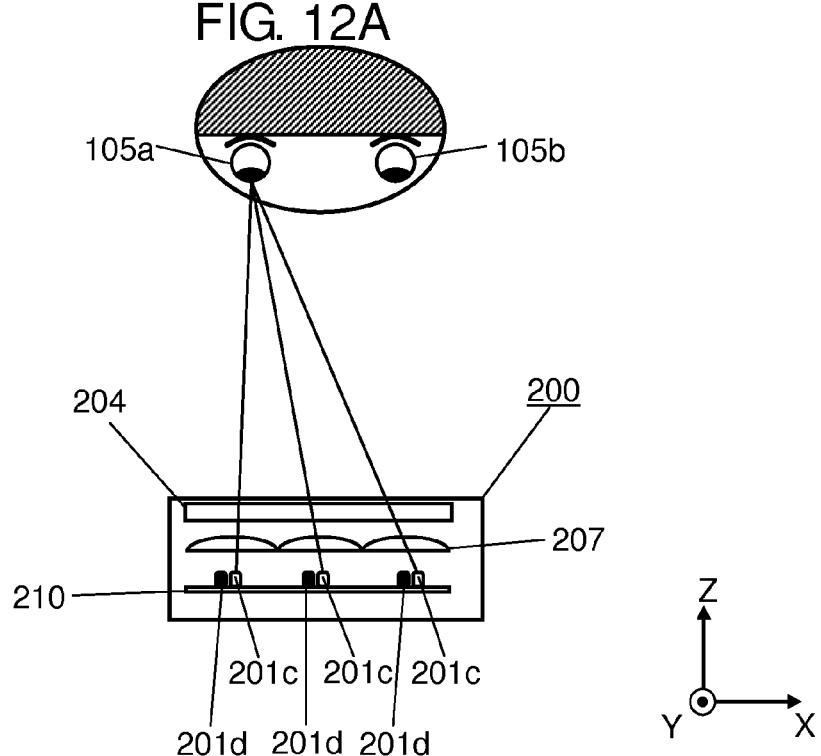
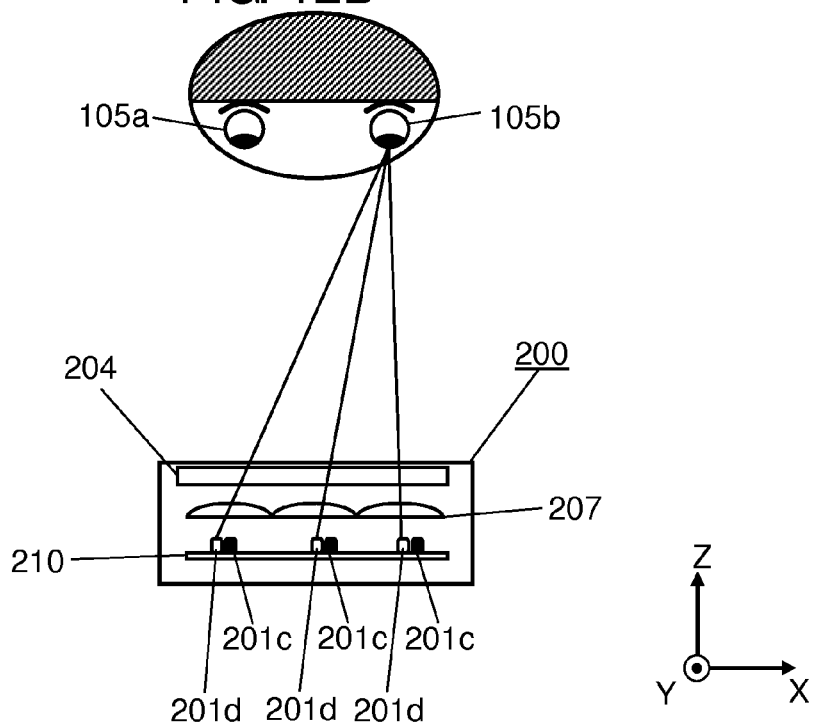

IMAGE DISPLAY APPARATUS

RELATED APPLICATIONS

This application is a continuation of International Application No. PCT/JP2014/000605, filed on Feb. 5, 2014, which in turn claims the benefit of Japanese Application No. 2013-029610, filed on Feb. 19, 2013, the disclosures of which Applications are incorporated by reference herein.

BACKGROUND

1. Field of the Disclosure

The present disclosure relates to an image display apparatus that includes a plurality of light sources and alternately displays a first image and a second image.

2. Background Art

Unexamined Japanese Patent Publication No. 2005-266293 (Patent Literature 1) discloses an image display apparatus that allows a viewer to three-dimensionally see a display image with the naked eye without dedicated glasses.

This image display apparatus includes a plurality of light sources corresponding to right and left eyes, a prism sheet for radiating the light emitted from each light source toward the right and left eyes of a viewer staying at a previously assumed position, and a liquid crystal panel for displaying an image using, as backlight, the light radiated from the prism sheet. The light radiated from the prism sheet serves as directional backlight having directivity. The light emission or no light emission of each light source is selected depending on whether a left-eye image is displayed on the panel or a right-eye image is displayed on it. Thus, the viewer can see a left-eye image with the left eye and see a right-eye image with the right eye, so that the viewer can three-dimensionally see the display image with the naked eye without dedicated glasses.

SUMMARY

The present disclosure provides an image display apparatus that is effective in reducing the occurrence of a crosstalk, which is mixing of a first image and a second image, and in providing a high-quality display image.

The image display apparatus of the present disclosure includes the following elements:
- a first light source for emitting light for displaying a first image;
- a second light source for emitting light for displaying a second image;
- a deflection unit for deflecting the light emitted from the first light source toward a previously assumed viewing position of the first image and deflecting the light emitted from the second light source toward a previously assumed viewing position of the second image; and
- a spatial light modulator that has a plurality of pixels each of which includes a plurality of subpixels, and modulates the light having passed through the deflection unit on the basis of a first image signal corresponding to the first image and a second image signal corresponding to the second image. Each subpixel is formed in a shape where the length in the first direction substantially parallel with the line connecting the viewing position of the first image to the viewing position of the second image is longer than or equal to the length in the second direction orthogonal to the first direction.

BRIEF DESCRIPTION OF DRAWINGS

FIG. 1 is an outward appearance of an image display apparatus in accordance with a first exemplary embodiment.

FIG. 2 is an exploded perspective view schematically showing the internal configuration of the image display apparatus in accordance with the first exemplary embodiment.

FIG. 3A is a sectional view of the image display apparatus in accordance with the first exemplary embodiment.

FIG. 3B is another sectional view of the image display apparatus in accordance with the first exemplary embodiment.

FIG. 5A is a partially enlarged view of a liquid crystal panel used for an experiment of a diffraction phenomenon.

FIG. 5B is a diagram schematically showing a diffraction phenomenon of directional backlight.

FIG. 7 is an exploded perspective view schematically showing the internal configuration of the image display apparatus in accordance with the second exemplary embodiment.

FIG. 12A is a sectional view of the image display apparatus in accordance with the second exemplary embodiment when it is used "left-longitudinally".

FIG. 12B is another sectional view of the image display apparatus in accordance with the second exemplary embodiment when it is used "left-longitudinally".

DETAILED DESCRIPTION

Figure 4:
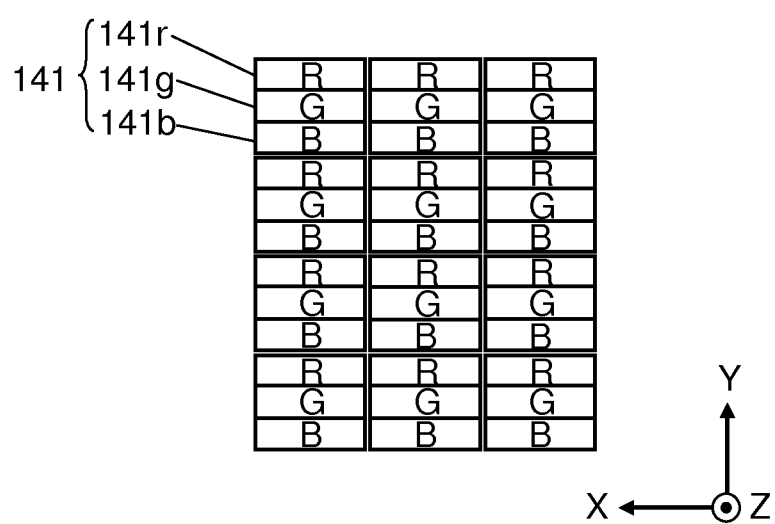
FIG. 4 is a partially enlarged view of a panel in accordance with the first exemplary embodiment.

Hereinafter, the exemplary embodiments will be described in detail appropriately with reference to the accompanying drawings. Description more detailed than necessary is sometimes omitted. For example, a detailed description of a well-known item and a repeated description of substantially the same configuration are sometimes omitted. This is for the purpose of preventing the following descriptions from becoming more redundant than necessary and allowing persons skilled in the art to easily understand the exemplary embodiments.

The accompanying drawings and the following descriptions are provided to allow the persons skilled in the art to sufficiently understand the present disclosure. It is not intended that they restrict the main subject described within the scope of the claims.

First Exemplary Embodiment

The first exemplary embodiment is hereinafter described using FIG. 1 to FIG. 5.

[1-1. Configuration]

FIG. 1 is an outward appearance of image display apparatus 100 in accordance with the first exemplary embodiment. In the following description, as shown in FIG. 1, for convenience sake, the horizontal direction of image display apparatus 100 is set as the X-axis direction, the vertical direction is set as the Y-axis direction, and the front direction (a viewer faces image display apparatus 100 in this direction) is set as the Z-axis direction. However, the present exemplary embodiment is not limited to this setting.

Image display apparatus 100 can display a first image and a second image alternately. For example, one of the right-eye image and left-eye image, which constitute an image for stereoscopic vision, can be set as the first image, and the other can be set as the second image.

In the following description, the right-eye image is set as the first image, and the left-eye image is set as the second image, and the images are alternately displayed in a cycle of 100 Hz or more.

Image display apparatus 100 is configured so that a viewer who views an image display surface of image display apparatus 100 from a previously assumed viewing position (viewing assumed position) can see a left-eye image with the left eye and a right-eye image with the right eye. Therefore, the viewer staying at the viewing assumed position can three-dimensionally see an image for stereoscopic vision displayed on image display apparatus 100 with the naked eye without using dedicated glasses or the like for stereoscopic vision.

As one example of the viewing assumed position, when image display apparatus 100 has a size of 50 inches for example, the viewing assumed position is set at a position separated from the center of the image display surface of image display apparatus 100 by about 2 m in the Z-axis direction. As the other example, when image display apparatus 100 has a size allowing a viewer to hold it—20 inches, for example—, the viewing assumed position is set at a position separated from the center of the image display surface of image display apparatus 100 by about 40 cm in the Z-axis direction.

The size of image display apparatus 100 and the viewing assumed position are simply one example of the exemplary embodiment. The present exemplary embodiment is not limited to them.

FIG. 2 is an exploded perspective view schematically showing the internal configuration of image display apparatus 100 in accordance with the first exemplary embodiment.

FIG. 3A and FIG. 3B are sectional views of image display apparatus 100 in accordance with the first exemplary embodiment. FIG. 3A and FIG. 3B are sectional views taken along line A-A of FIG. 1. FIG. 3A and FIG. 3B further show a viewer who views a display image from a viewing assumed position. FIG. 3A shows the phenomenon where the light emitted from first light source 101a is deflected by double-sided prism sheet 103, is output from image display apparatus 100, and arrives at right eye 105a of the viewer staying at the viewing assumed position. FIG. 3B shows the phenomenon where the light emitted from second light source 101b arrives at left eye 105b of the viewer.

Image display apparatus 100 includes, in a casing, light source unit 110, double-sided prism sheet 103 as a deflection unit, panel 104 that is a spatial light modulator (SLM), a control circuit of light source unit 110 and panel 104, and a power supply circuit (not shown).

Light source unit 110 includes first light source 101a, second light source 101b, and light guide plate 102.

Light guide plate 102 is made of a generally known material such as acrylic, and includes incident end surfaces 102a and 102b for taking in light and light outgoing surface 102c for outputting the light.

First light source 101a is a light source for emitting the light for displaying a first image, and second light source 101b is a light source for emitting the light for displaying a second image. When the first image is displayed on panel 104, first light source 101a emits light and second light source 101b turns off. When the second image is displayed on panel 104, second light source 101b emits light and first light source 101a turns off. Thus, first light source 101a and second light source 101b alternately emit light in accordance with the display image.

First light source 101a is disposed on one end (incident end surface 102a) side of light guide plate 102 in the X-axis direction, and second light source 101b is disposed on the other end (incident end surface 102b) side. In other words, first light source 101a and second light source 101b are disposed in parallel with the X-axis direction on both sides of light guide plate 102.

The light emitted from first light source 101a enters light guide plate 102 through incident end surface 102a, and the light emitted from second light source 101b enters light guide plate 102 through incident end surface 102b. The light having entered light guide plate 102 is repeatedly reflected inside light guide plate 102, and is gradually output from light outgoing surface 102c. Thus, the light emitted from first light source 101a or second light source 101b is output, as substantially uniform light, from light outgoing surface 102c of light guide plate 102 in the front direction (Z-axis direction), and light guide plate 102 thus performs surface emission. The outgoing direction of light from light outgoing surface 102c when the light comes through incident end surface 102a is different from that when the light comes through incident end surface 102b. Therefore, the incident direction of light to double-sided prism sheet 103 when first light source 101a emits the light is different from that when second light source 101b emits the light.

In order that the light emitted from first light source 101a and second light source 101b is efficiently made to enter light guide plate 102, the following configuration may be employed:

first light source 101a is covered with light source cover 112a that is processed (e.g. mirror finished) to provide the state where the incident end surface 102a side is open and the optical reflectance of the inside is high; and second light source 101b is covered with similar light source cover 112b whose incident end surface 102b side is open.

As shown in FIG. 2, first light source 101a and second light source 101b can be formed by disposing line light sources such as cold cathode fluorescent lamps (CCFLs) along incident end surface 102a and incident end surface 102b.

Double-sided prism sheet 103 includes triangular prism column 103a on the light guide plate 102 side and cylindrical lens column 103b on the panel 104 side. The light output from light outgoing surface 102c of light guide plate 102 enters double-sided prism sheet 103 through triangular prism column 103a, and is output, as light having directivity, through cylindrical lens column 103b. At this time, the direction of light entering triangular prism column 103a when first light source 101a emits the light is different from that when second light source 101b emits the light. Therefore, when first light source 101a emits light, the light output through cylindrical lens column 103b travels toward right eye 105a of the viewer who views a display image from a viewing assumed position, and, when second light source 101b emits light, the light output through cylindrical lens column 103b travels toward left eye 105b of the viewer. In other words, double-sided prism sheet 103 deflects the light emitted from first light source 101a toward a previously assumed viewing position of the first image, and deflects the light emitted from second light source 101b toward a previously assumed viewing position of the second image.

In the present exemplary embodiment, light guide plate 102 and double-sided prism sheet 103 are configured to have the above-mentioned optical characteristic, namely so that the light output as directional backlight from double-sided prism sheet 103 appropriately separately arrives at right eye 105a and left eye 105b of the viewer who views a display image from the viewing assumed position.

In double-sided prism sheet 103, preferably, the repeating interval (pitch) of triangular prism column 103a is wider than the pitch of cylindrical lens column 103b. The pitch of cylindrical lens column 103b in the present exemplary embodiment is about 20 mm, for example. However, the present exemplary embodiment is not limited to this numerical value.

Panel 104 includes a plurality of pixels each of which consists of a plurality of subpixels, and uses, as backlight, the light transmitted through double-sided prism sheet 103. Based on a first image signal corresponding to the first image and a second image signal corresponding to the second image, panel 104 modulates and transmits the backlight (light quantity is adjusted for transmission), and the first image and second image are alternately displayed on the image display surface of panel 104. The backlight transmitted through panel 104 is a directional backlight having the above-mentioned directivity. Therefore, as shown in FIG. 3A and FIG. 3B, the first image displayed on panel 104 is observed by right eye 105a of the viewer staying at the viewing assumed position, and the second image displayed on panel 104 is observed by left eye 105b of the viewer. Thus, the viewer can three-dimensionally see an image for stereoscopic vision displayed on panel 104 with the naked eye.

Panel 104 can be formed of a liquid crystal panel, for example.

FIG. 4 is a partially enlarged view of panel 104 in accordance with the first exemplary embodiment. Symbols R, G, and B in FIG. 4 are shown for convenience sake, and are not actually displayed on each subpixel.

As shown in FIG. 4, panel 104 includes a plurality of pixels 141 arranged in a matrix in the X-axis direction and Y-axis direction. One pixel 141 is formed of three subpixels: red subpixel 141r, green subpixel 141g, and blue subpixel 141b that are arranged in parallel with the Y-axis direction. Each subpixel is formed in a substantially rectangular shape.

Each subpixel is formed in a shape where the length in the first direction is longer than or equal to the length in the second direction. The first direction is substantially parallel with the line that connects the viewing position of the first image to the viewing position of the second image. The second direction is orthogonal to the first direction.

In the present exemplary embodiment, the viewing position of the first image means the position of right eye 105a of the viewer who views a display image from a viewing assumed position, and the viewing position of the second image means the position of left eye 105b of the viewer. In other words, the first direction means the horizontal direction of image display apparatus 100, namely the X-axis direction. The second direction means the vertical direction of image display apparatus 100, namely the Y-axis direction.

Therefore, this can translate into the expression where each subpixel is formed in a shape where the length in the first direction (X-axis direction) is longer than or equal to the length in the second direction (Y-axis direction) orthogonal to the first direction, and the first direction is substantially parallel with the arrangement direction of first light source 101a and second light source 101b.

[1-2. Operation]

The operation of image display apparatus 100 having such a configuration is described hereinafter.

Image display apparatus 100 alternately (in a cycle of 100 Hz or more) receives a right-eye image signal and a left-eye image signal, which constitute an image for stereoscopic vision, for example. In the present exemplary embodiment, for example, a right-eye image is set as the first image, and a left-eye image is set as the second image.

When panel 104 is controlled by the right-eye image signal, first light source 101a emits light and second light source 101b turns off in light source unit 110. The light of first light source 101a output from light guide plate 102 is deflected by double-sided prism sheet 103, and is output toward the viewing position of the first image. This light passes as directional backlight through panel 104, and then arrives at the viewing position of the first image, namely right eye 105a of the viewer staying at the viewing assumed position.

Regarding the light entering right eye 105a of the viewer, the transmission amount of primary light through each subpixel is adjusted by panel 104 on the basis of the right-eye image signal. Therefore, right eye 105a of the viewer sees the right-eye image based on this image signal.

When panel 104 is controlled by the left-eye image signal, first light source 101a turns off and second light source 101b emits light in light source unit 110. The light of second light source 101b output from light guide plate 102 is deflected by double-sided prism sheet 103, and is output toward the viewing position of the second image. This light passes as directional backlight through panel 104, and then arrives at the viewing position of the second image, namely left eye 105b of the viewer staying at the viewing assumed position.

Regarding the light entering left eye 105b of the viewer, the transmission amount of primary light through each subpixel is adjusted by panel 104 on the basis of the left-eye image signal. Therefore, left eye 105b of the viewer sees the left-eye image based on this image signal.

Thus, when the right-eye image is displayed, the light emitted from the light source for the right eye (first light source 101a) enters right eye 105a of the viewer who views an image for stereoscopic vision displayed on image display apparatus 100 from the viewing assumed position. Therefore, the right-eye image can be seen by right eye 105a. While, when the left-eye image is displayed, the light emitted from the light source for the left eye (second light source 101b) enters left eye 105b, and hence the left-eye image can be seen by left eye 105b. Thus, the viewer can three-dimensionally see an image for stereoscopic vision displayed on image display apparatus 100 with the naked eye.

[1-3. Effect or the Like]

The inventor(s) has verified, by experiment, the following fact:

in the case where the width of the opening (region transmitting the backlight) of each subpixel is narrow, a diffraction phenomenon occurs when directional backlight is transmitted through subpixels, the directional backlight beams after the transmission through subpixels interfere with each other and scatter in a plurality of directions, and hence the directivity of the backlight reduces to inhibit the stereoscopic vision.

FIG. 5A is a partially enlarged view of a liquid crystal panel used for the experiment of the diffraction phenomenon. FIG. 5B is a diagram schematically showing the diffraction phenomenon of the directional backlight. FIG. 5B schematically shows the phenomenon where the directional backlight by light emission from first light source 101a of light source unit 110 enters the panel including the subpixels shown in FIG. 5A. In the example shown in FIG. 5B, the directional backlight by light emission from first light source 101a enters the panel obliquely with respect to the X-axis direction.

For example, when each pixel 142 is formed of subpixels (red subpixel 142r, green subpixel 142g, and blue subpixel 142b) having a shape shown in FIG. 5A, the width of the opening of each subpixel in the travel direction of the directional backlight is narrower compared with each subpixel shown in FIG. 4. Here, in FIG. 5A, the length of the side in the Y-axis direction is longer than the length of the side in the X-axis direction. Therefore, as shown in FIG. 5B, a diffraction phenomenon occurs when the directional backlight is transmitted through subpixels, the light beams having undergone the diffraction phenomenon interfere with each other and scatter in various directions, and hence the directivity of the backlight reduces.

Even when the viewer stays at the viewing assumed position, the right-eye image of the image for stereoscopic vision displayed by the backlight having the reduced directivity enters the right and left eyes of the viewer, and the left-eye image also enters the right and left eyes. The viewer observes an image created by mixing (crosstalk) the right and left images, and the stereoscopic vision is inhibited.

Regarding the panel having subpixels fined by increasing the resolution, therefore, when the subpixels have a shape shown in FIG. 5A, a crosstalk is apt to occur between the right and left images, and the stereoscopic vision is apt to be inhibited.

In the present exemplary embodiment, as shown in FIG. 4, each subpixel of panel 104 is formed so as to have a shape where the length of the side in the X-axis direction is longer than or equal to the length of the side in the Y-axis direction.

For example, when each subpixel is formed so that one pixel 141 has a substantially square shape, the length of the side of the subpixel in the X-axis direction is three times longer than the length of the side in the Y-axis direction in the present exemplary embodiment.

The size of the opening of each subpixel in the travel direction of the directional backlight can be greater compared with the panel having the subpixels having the shape shown in FIG. 5A. Therefore, even when the resolution of panel 104 is increased and each subpixel is fined, a crosstalk can be prevented from occurring between the first image and second image and a high-quality display image can be obtained.

The inventor(s) has verified by experiment that, in the panel having the subpixels having the shape shown in FIG. 5A, a diffraction phenomenon is apt to occur when the resolution is 200 ppi (pixel per inch) or more. At this time, the length of the opening of each subpixel in the X-axis direction is 42 μm or less. This can translate into the expression where a diffraction phenomenon is apt to occur when the length of the opening of each subpixel in the X-axis direction is 42 μm or less.

Therefore, in the present exemplary embodiment, preferably, the length of the side of each subpixel in the X-axis direction (the length in the first direction) is set at 43 μm or more.

Thus, in image display apparatus 100 of the present exemplary embodiment, each subpixel of panel 104 is formed so as to have a shape where the length in the first direction (X-axis direction), which is substantially parallel with the arrangement direction of first light source 101a and second light source 101b, is longer than or equal to the length in the second direction (Y-axis direction) orthogonal to the first direction.

Thus, the viewer who views image display apparatus 100 from the viewing assumed position can see the first image and second image displayed with directional backlight while the crosstalk is reduced. The viewer can see the left-eye image with the left eye and see the right-eye image with the right eye, for example. Therefore, the viewer can three-dimensionally see a high-quality image for stereoscopic vision with the naked eye without dedicated glasses.

Second Exemplary Embodiment

The second exemplary embodiment is hereinafter described using FIG. 6 to FIG. 12.

[2-1. Configuration]

Image display apparatus 200 of the second exemplary embodiment displays a first image and a second image alternately, similarly to image display apparatus 100 of the first exemplary embodiment. When one of a right-eye image and a left-eye image, which constitute an image for stereoscopic vision, is set as a first image, and the other is set as a second image, a viewer staying at a previously assumed viewing position (viewing assumed position) can three-dimensionally see the images displayed on image display apparatus 200, similarly to the first exemplary embodiment.

Image display apparatus 200 differs from image display apparatus 100 of the first exemplary embodiment in that image display apparatus 200 is configured so that, even when the viewer turns and uses image display apparatus 200, the viewer can three-dimensionally see an image with the naked eye. The difference from the first exemplary embodiment is hereinafter described.

Image display apparatus 200 of the present exemplary embodiment has a size of 10 inches that allows it to be held with one hand. The viewer can easily turn and use image display apparatus 200. However, the size of image display apparatus 200 is simply one example of the exemplary embodiment, and the present exemplary embodiment is not limited to this.

Hereinafter, the state where the attitude of image display apparatus 200 is kept so that the long side of the image display surface is substantially parallel with the parallax direction of the viewer is assumed to be "lateral". The state where image display apparatus 200 is turned from the state of "lateral" by 90° clockwise or counterclockwise is assumed to be "longitudinal". Here, in this state, the long side of the image display surface is substantially orthogonal to the parallax direction of the viewer. The parallax direction is substantially parallel with the line interconnecting right eye 105a and left eye 105b of the viewer who views a display image from the viewing assumed position.

Hereinafter, components having an operation, function, and configuration substantially similar to those of the components of the first exemplary embodiment are denoted with the same reference marks as those in the first exemplary embodiment, and the descriptions of those components are omitted.

Figure 6A:
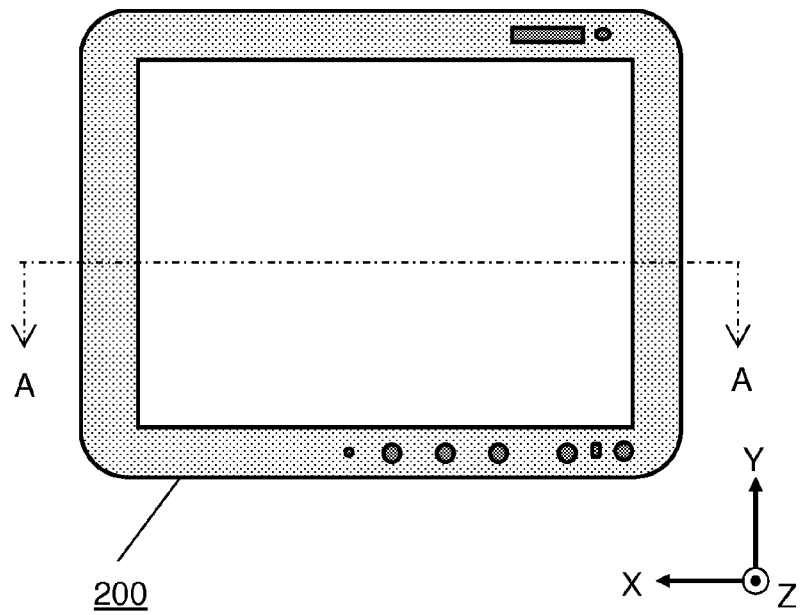
FIG. 6A is an outward appearance of an image display apparatus in accordance with a second exemplary embodiment when it is used "laterally".
Figure 6B:
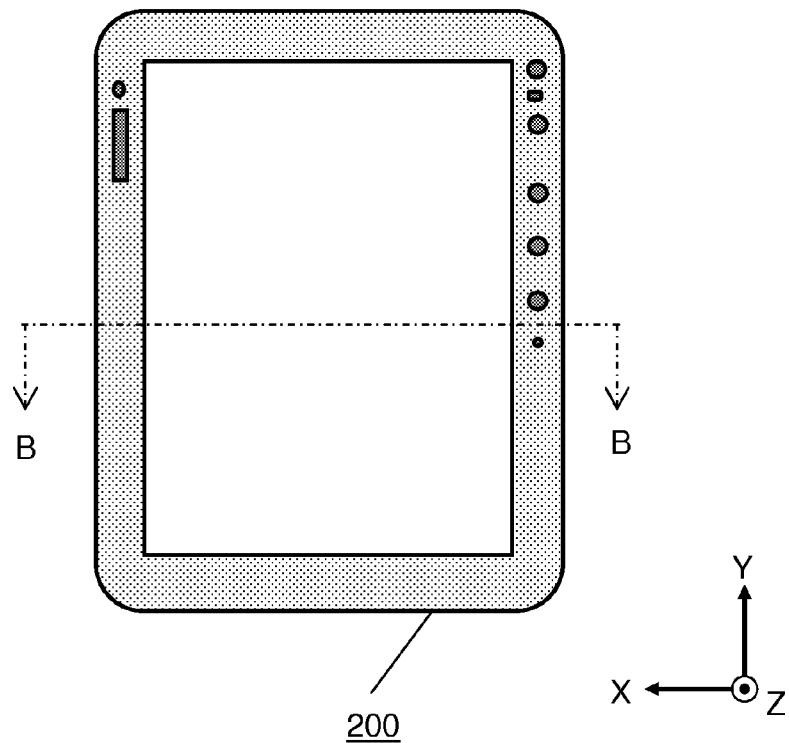
FIG. 6B is an outward appearance of the image display apparatus in accordance with the second exemplary embodiment when it is used "longitudinally".

FIG. 6A is an outward appearance of image display apparatus 200 in accordance with the second exemplary embodiment when it is used "laterally". FIG. 6B is an outward appearance of image display apparatus 200 in accordance with the second exemplary embodiment when it is used "longitudinally".

In the present exemplary embodiment, image display apparatus 200 is used in the state where the orientation is changed, so that it is difficult to define the X axis and Y axis with reference to image display apparatus 200. In the present exemplary embodiment, therefore, the parallax direction of the viewer is assumed as the X-axis direction and the direction orthogonal to the parallax direction is assumed as the Y-axis direction, for convenience sake. Therefore, when image display apparatus 200 is used "laterally", the long side of the image display surface is substantially parallel with the X-axis direction and the short side is substantially parallel with the Y-axis direction. When image display apparatus 200 is used "longitudinally", the short side of the image display surface is substantially parallel with the X-axis direction and the long side is substantially parallel with the Y-axis direction. In the present exemplary embodiment, however, the X axis and Y axis are not limited to this setting.

FIG. 7 is an exploded perspective view schematically showing the internal configuration of image display apparatus 200 in accordance with the second exemplary embodiment.

Figure 8A:
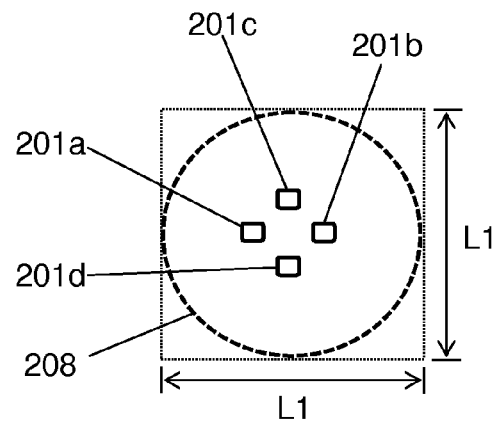
FIG. 8A is an enlarged view, from the front side, of a combination of one lens and one set of light sources in accordance with the second exemplary embodiment.
Figure 8B:
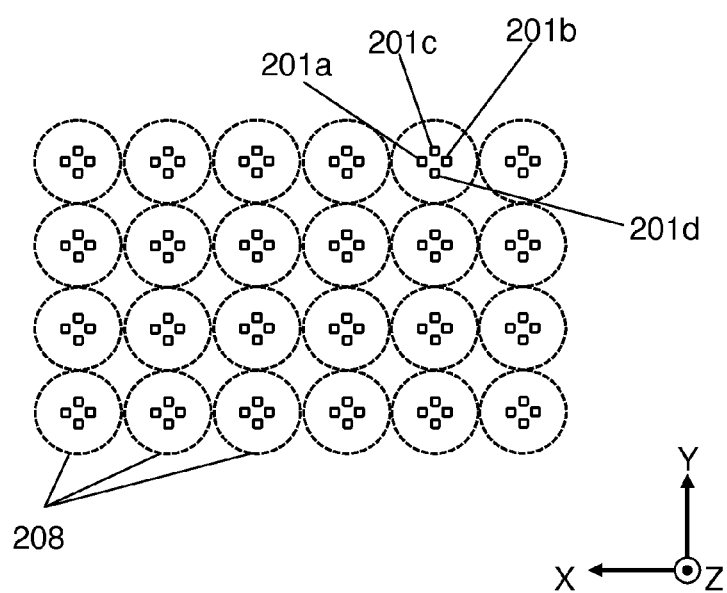
FIG. 8B is an enlarged view, from the front side (Z-axis direction), of a combination of lenses constituting a lens sheet and light sources in accordance with the second exemplary embodiment.

FIG. 8A is an enlarged view, from the front side (Z-axis direction), of a combination of one lens 208 and one set of light sources in accordance with the second exemplary embodiment. FIG. 8B is an enlarged view, from the front side (Z-axis direction), of a combination of lenses 208 that constitute lens sheet 207 and light sources in accordance with the second exemplary embodiment. FIG. 7, FIG. 8A, and FIG. 8B show diagrams when image display apparatus 200 is used "laterally".

Image display apparatus 200 includes light source unit 210, lens sheet 207 as a deflection unit, and panel 204 as a spatial light modulator. Image display apparatus 200 further includes a control unit, a power supply unit, and a detection unit (not shown in FIG. 7). These are described later.

Light source unit 210 includes a plurality of first light sources 201a, second light sources 201b, third light sources 201c, and fourth light sources 201d on a plane that is parallel with the image display surface. In light source unit 210, one first light source 201a and one second light source 201b form one pair, and one third light source 201c and one fourth light source 201d form one pair. These two pairs (namely, four light sources) form one set, and the sets are arranged in a matrix in the X-axis direction and Y-axis direction.

In the first exemplary embodiment, the light source used for displaying the first image and the light source used for displaying the second image are fixed. In the present exemplary embodiment, however, the light source used for displaying the first image and the light source used for displaying the second image are selected in accordance with the attitude (orientation in use) of image display apparatus 200, specifically in accordance with the detection result of the detection unit for detecting the attitude of image display apparatus 200. The detection unit is described later.

For example, when first light source 201a is selected as a light source for displaying the first image, the light source for displaying the second image is second light source 201b. When second light source 201b is selected as a light source for displaying the first image, the light source for displaying the second image is first light source 201a. When third light source 201c is selected as a light source for displaying the first image, the light source for displaying the second image is fourth light source 201d. When fourth light source 201d is selected as a light source for displaying the first image, the light source for displaying the second image is third light source 201c.

In light source unit 210, when the first image is displayed on panel 204, only the light source selected as a light source for displaying the first image emits light, and the other light sources turn off. When the second image is displayed on panel 204, only the light source selected as a light source for displaying the second image emits light, and the other light sources turn off.

In light source unit 210, the light sources are arranged so as to satisfy the following conditions:
when image display apparatus 200 is used "laterally", the line connecting first light source 201a to second light source 201b is substantially parallel with the X-axis; and when image display apparatus 200 is used "longitudinally", the line connecting third light source 201c to fourth light source 201d is substantially parallel with the X-axis.

In other words, in light source unit 210, third light source 201c and fourth light source 201d are arranged in the direction substantially orthogonal to the arrangement direction of first light source 201a and second light source 201b.

In light source unit 210, when image display apparatus 200 is used "laterally", the pair of first light source 201a and second light source 201b alternately emit light, and, when image display apparatus 200 is used "longitudinally", the pair of third light source 201c and fourth light source 201d alternately emit light.

Light source unit 210 can be produced by mounting point light sources such as LEDs (light emitting diodes) or the like for emitting white light to a substrate formed in a planar shape, for example.

Hereinafter, the direction substantially parallel with the line connecting first light source 201a to second light source 201b is set to be the first direction, and the direction substantially parallel with the line connecting third light source 201c to fourth light source 201d is set to be the second direction. Therefore, the first direction is substantially parallel with the X-axis when image display apparatus 200 is used "laterally", and the second direction is substantially parallel with the X-axis when image display apparatus 200 is used "longitudinally".

In the following description, an example is shown where, when image display apparatus 200 is used "laterally", first light source 201a emits light for displaying the first image and second light source 201b emits light for displaying the second image. An example is shown where, when image display apparatus 200 is used "longitudinally", third light source 201c emits light for displaying the first image and fourth light source 201d emits light for displaying the second image.

Lens sheet 207 is formed in parallel with the image display surface by arranging a plurality of lenses 208 in a matrix in the X-axis direction and the Y-axis direction. As shown in FIG. 8A and FIG. 8B, one lens 208 corresponds to one set formed of the above-mentioned four light sources. In the present exemplary embodiment, as shown in FIG. 8A, one lens 208 has such a size that lens 208 remains within a square having a side (L1) of about 20 mm. However, lens 208 is not limited to this size.

Each lens 208 in lens sheet 207 is separated from each light source in light source unit 210 by a distance substantially equal to the focal length of lens 208. Lens 208 changes the light emitted from each light source to substantially parallel light having directivity, and outputs it.

The optical characteristic related to the deflection angle of each lens 208 and the relative arrangement positions of each lens 208 and each light source are set so as to satisfy the following conditions:

when image display apparatus 200 is used "laterally", the light emitted from first light source 201a is changed to parallel light through lens 208, is output at the deflection angle based on the arrangement position of lens 208, and travels toward the viewing position of the first image, and the light emitted from second light source 201b is changed to parallel light through lens 208, is output at the deflection angle based on the arrangement position of lens 208, and travels toward the viewing position of the second image; and when image display apparatus 200 is used "longitudinally", the light emitted from third light source 201c (or fourth light source 201d) is changed to parallel light through lens 208, is output at the deflection angle based on the arrangement position of lens 208, and travels toward the viewing position of the first image, and the light emitted from fourth light source 201d (or third light source 201c) is changed to parallel light through lens 208, is output at the deflection angle based on the arrangement position of lens 208, and travels toward the viewing position of the second image.

When the first image is a right-eye image constituting an image for stereoscopic vision and the second image is a left-eye image, the viewing position of the first image is the position of right eye 105a of a viewer staying at a viewing assumed position, and the viewing position of the second image is the position of left eye 105b of the viewer.

Therefore, for example, the relative arrangement positions of each lens 208 and each light source are set so as to satisfy the following conditions:

right eye 105a of the viewer staying at the viewing assumed position, the optical center of lens 208, and the light source for the right eye (light source for displaying the first image) are arranged on substantially one straight line; and left eye 105b of the viewer, the optical center of lens 208, and the light source for the left eye (light source for displaying the second image) are arranged on substantially one straight line.

In this case, lens sheet 207 can output the light emitted from the light source for the right eye toward right eye 105a of the viewer staying at the viewing assumed position, and can output the light emitted from the light source for the left eye toward left eye 105b of the viewer.

Each of lenses 208 constituting lens sheet 207 may be any lens as long as it can change the light emitted from each light source to parallel light having directivity and can output it in a target direction. For example, each lens 208 may be a convex lens, a Fresnel lens, or a diffraction lens.

Similarly to panel 104 shown in the first exemplary embodiment, panel 204 includes a plurality of pixels each of which consists of a plurality of subpixels, and uses, as backlight, light transmitted through lens sheet 207. Based on a first image signal corresponding to the first image and a second image signal corresponding to the second image, panel 204 modulates and transmits the backlight (light quantity is adjusted for transmission), and the first image and second image are alternately displayed on the image display surface of panel 204.

The backlight transmitted through panel 204 is a directional backlight having the above-mentioned directivity. Each light source is appropriately selected in accordance with the detection result of the detection unit for detecting the attitude of image display apparatus 200. Therefore, the first image displayed on panel 204 is observed by right eye 105a of the viewer staying at the viewing assumed position, and the second image displayed on panel 204 is observed by left eye 105b of the viewer. Thus, the viewer can three-dimensionally see the image for stereoscopic vision displayed on panel 204 with the naked eye.

Panel 204 can be formed of a liquid crystal panel, for example.

Figure 9:
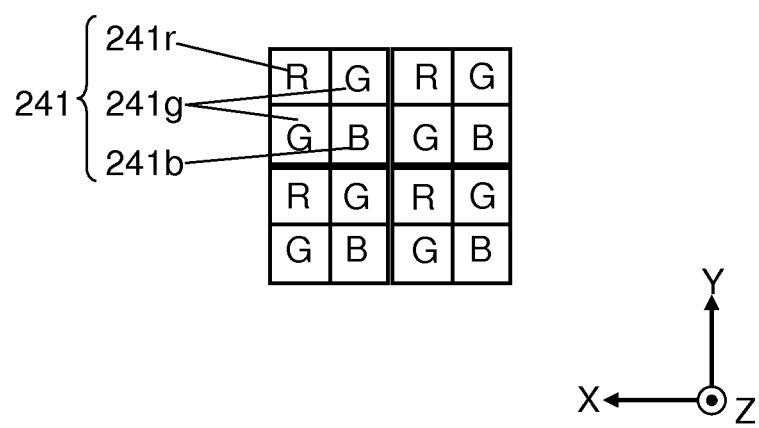
FIG. 9 is a partially enlarged view showing one configuration example of pixels 241 included in panel 204 in accordance with the second exemplary embodiment.

FIG. 9 is a partially enlarged view showing one configuration example of pixels 241 included in panel 204 in accordance with the second exemplary embodiment. FIG. 9 shows a diagram when image display apparatus 200 is used "laterally". Symbols R, G, and B in FIG. 9 are shown for convenience sake, and are not actually displayed on each subpixel.

As shown in FIG. 9, panel 204 includes a plurality of pixels 241 arranged in a matrix in the X-axis direction and Y-axis direction. One pixel 241 is formed by arranging, in a 2×2 matrix, four subpixels: red subpixel 241r, blue subpixel 241b, and two green subpixels 241g.

In panel 204, each subpixel is formed in a substantially square shape. The width of the opening (region transmitting the backlight) of each subpixel in the X-axis direction is substantially equal to that in the Y-axis direction. Whether image display apparatus 200 is used "laterally" or "longitudinally", the width of the opening of each subpixel in the travel direction of the directional backlight does not substantially vary.

Each pixel 241 also has a substantially square shape. Therefore, whether image display apparatus 200 is used "laterally" or "longitudinally", the shape of pixel 241 does not substantially vary.

Figure 10:
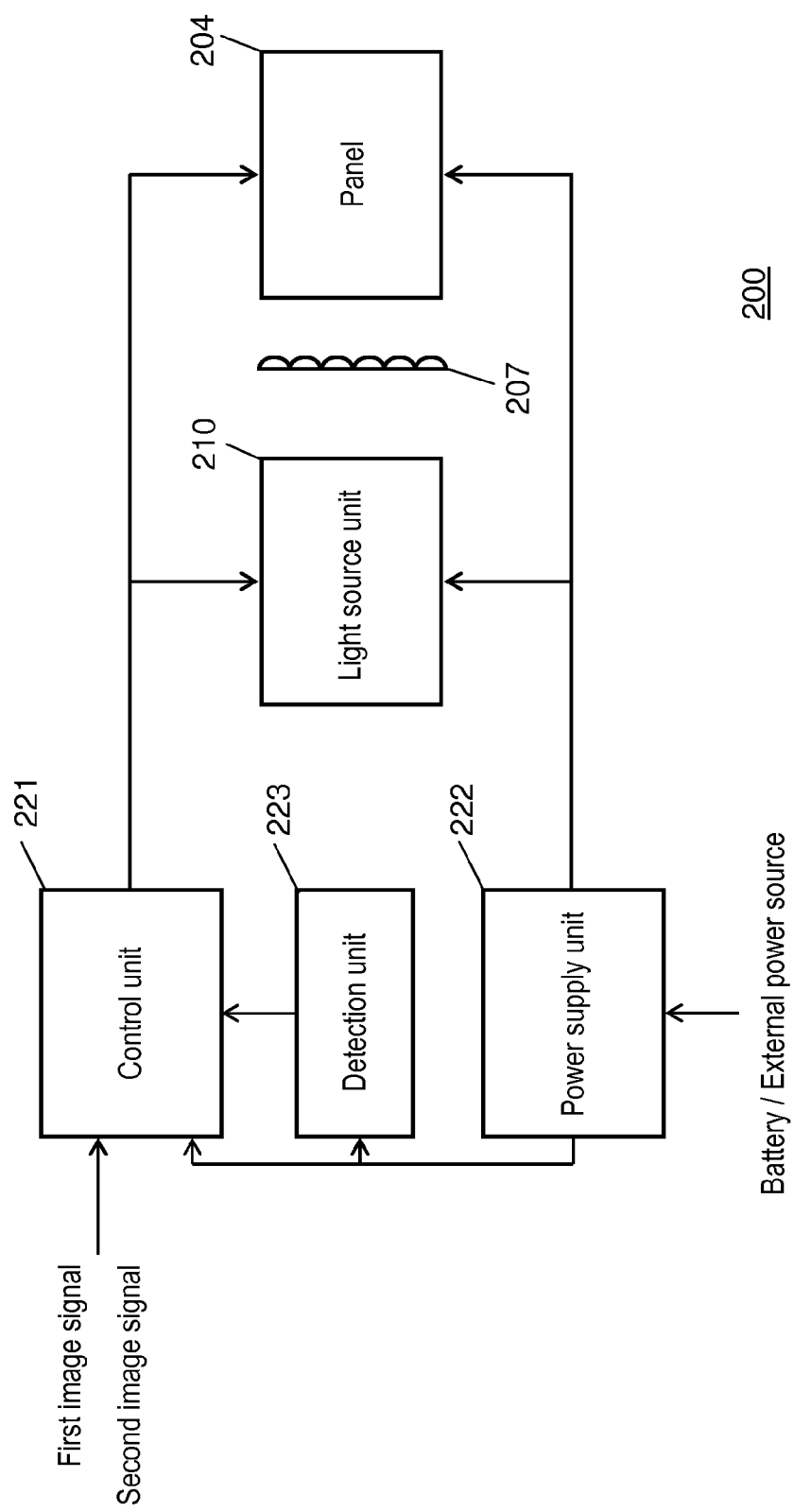
FIG. 10 is a circuit block diagram of the image display apparatus in accordance with the second exemplary embodiment.

FIG. 10 is a circuit block diagram of image display apparatus 200 in accordance with the second exemplary embodiment.

As shown in FIG. 10, image display apparatus 200 includes control unit 221, power supply unit 222, detection unit 223 for detecting the attitude (orientation in use) of image display apparatus 200, and above-mentioned light source unit 210 and panel 204. FIG. 10 also shows lens sheet 207.

Power supply unit 222 supplies required electric power to units including light source unit 210 and panel 204. The power source of power supply unit 222 is a battery included in image display apparatus 200, or an external power source.

Detection unit 223 includes a gyro circuit formed using a generally used acceleration sensor, tilt sensor, or angular velocity sensor, and detects whether image display apparatus 200 is in the "lateral" state or the "longitudinal" state.

Hereinafter, the state where image display apparatus 200 is turned counterclockwise by 90° from the "lateral" state is referred to as a "left longitudinal" state, and the state where image display apparatus 200 is turned clockwise by 90° from the "lateral" state is referred to as a "right longitudinal" state. The "left longitudinal" state means the state where image display apparatus 200 is turned so that the upper side thereof in the "lateral" state becomes the left side. The "right longitudinal" state means the state where image display apparatus 200 is turned so that the upper side thereof in the "lateral" state becomes the right side. Therefore, the "longitudinal" state shown in FIG. 6B is the "left longitudinal" state. The state where image display apparatus 200 is turned clockwise or counterclockwise by 180° from the "lateral" state is referred to as an "inverted" state.

Detection unit 223 detects which of the "lateral", "left longitudinal", "right longitudinal", and "inverted" states image display apparatus 200 is in, and outputs the result to control unit 221.

Control unit 221 alternately (in a cycle of 100 Hz or more, for example) receives an image signal of the first image (e.g. right-eye image) and an image signal of the second image (e.g. left-eye image). In addition, control unit 221 receives the detection result of detection unit 223. Then, control unit 221 controls light source unit 210 and panel 204, on the basis of the detection result of detection unit 223 and the image signals of the first image and second image.

For example, when the detection result of detection unit 223 indicates "lateral", control unit 221 makes first light sources 201a emit light and turns off the other light sources when the first image is displayed on panel 204, or makes second light sources 201b emit light and turns off the other light sources when the second image is displayed on panel 204. When the detection result indicates "left longitudinal", control unit 221 makes third light sources 201c emit light and turns off the other light sources when the first image is displayed, or makes fourth light sources 201d emit light and turns off the other light sources when the second image is displayed. When the detection result indicates "right longitudinal", control unit 221 makes fourth light sources 201d emit light and turns off the other light sources when the first image is displayed, or makes third light sources 201c emit light and turns off the other light sources when the second image is displayed. When the detection result indicates "inverted", control unit 221 makes second light sources 201b emit light and turns off the other light sources when the first image is displayed, or makes first light sources 201a emit light and turns off the other light sources when the second image is displayed.

The description of light source unit 210 and panel 204 overlaps the above-mentioned one, and hence is omitted.

The correspondence between each light source and the first and second images is not limited to the above-mentioned one, but may be a correspondence inverse to the above-mentioned one.

[2-2. Operation]

The operation of image display apparatus 200 having the above-mentioned configuration is described hereinafter.

In the following description, image display apparatus 200 alternately (in a cycle of 100 Hz or more, for example) receives a right-eye image signal as the image signal of the first image and a left-eye image signal as the image signal of the second image.

Figure 11A:
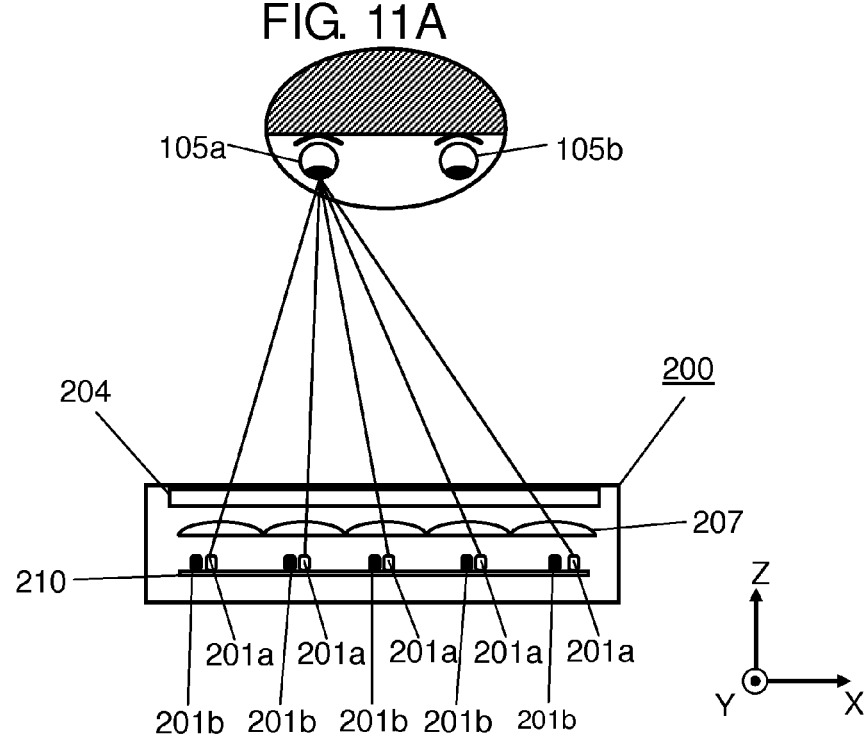
FIG. 11A is a sectional view of the image display apparatus in accordance with the second exemplary embodiment when it is used "laterally".
Figure 11B:
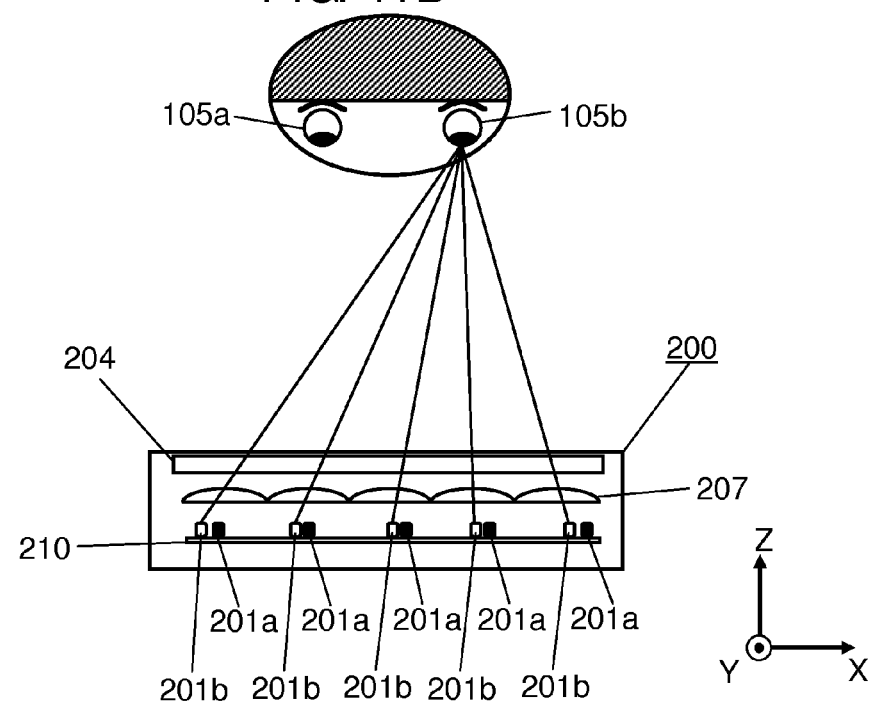
FIG. 11B is another sectional view of the image display apparatus in accordance with the second exemplary embodiment when it is used "laterally".

FIG. 11A and FIG. 11B are sectional views of image display apparatus 200 in accordance with the second exemplary embodiment when it is used "laterally". FIG. 12A and FIG. 12B are sectional views of image display apparatus 200 in accordance with the second exemplary embodiment when it is used "left-longitudinally". FIG. 11A and FIG. 11B schematically show sectional views taken along line A-A of FIG. 6A. FIG. 12A and FIG. 12B schematically show sectional views taken along line B-B of FIG. 6B. Each of the drawings further shows a viewer who views a display image from a viewing assumed position.

FIG. 11A schematically shows the phenomenon where the light emitted from first light source 201a arrives at right eye 105a of the viewer staying at the viewing assumed position when image display apparatus 200 is used "laterally". FIG. 11B schematically shows the phenomenon where the light emitted from second light sources 201b arrives at left eye 105b of the viewer. FIG. 12A schematically shows the phenomenon where the light emitted from third light sources 201c arrives at right eye 105a of the viewer staying at the viewing assumed position when image display apparatus 200 is used "left-longitudinally". FIG. 12B schematically shows the phenomenon where the light emitted from fourth light sources 201d arrives at left eye 105b of the viewer.

When image display apparatus 200 is used "laterally", detection unit 223 detects that the attitude of image display apparatus 200 is "lateral". Based on the detection result, control unit 221 controls panel 204 so that the first image and second image are displayed in the correct directions.

Control unit 221 controls light source unit 210 so that first light sources 201a are made to emit light and the other light sources are turned off when the first image is displayed on panel 204, and second light sources 201b are made to emit light and the other light sources are turned off when the second image is displayed on panel 204.

When first light sources 201a emit light, the light from first light sources 201a is deflected by lens sheet 207, and is output toward the viewing position of the first image. This light passes as directional backlight through panel 204, and then arrives at the viewing position of the first image, namely right eye 105a of the viewer staying at the viewing assumed position, as shown in FIG. 11A.

The light entering right eye 105a of the viewer is modulated (light quantity of transmitted light is adjusted) on the basis of the image signal of the first image by panel 204, so that the first image (right-eye image) based on this image signal is seen by right eye 105a of the viewer.

When second light sources 201b emit light, the light from second light sources 201b is deflected by lens sheet 207, and is output toward the viewing position of the second image. This light passes as directional backlight through panel 204, and then arrives at the viewing position of the second image, namely left eye 105b of the viewer staying at the viewing assumed position, as shown in FIG. 11B.

The light entering left eye 105b of the viewer is modulated (light quantity of transmitted light is adjusted) on the basis of the image signal of the second image by panel 204, so that the second image (left-eye image) based on this image signal is seen by left eye 105b of the viewer.

When image display apparatus 200 is used "left-longitudinally", detection unit 223 detects that the attitude of image display apparatus 200 is "left-longitudinal". Based on the detection result, control unit 221 controls panel 204 so that the first image and second image are displayed in the correct directions.

Control unit 221 controls light source unit 210 so that third light sources 201c are made to emit light and the other light sources are turned off when the first image is displayed on panel 204, and fourth light sources 201d are made to emit light and the other light sources are turned off when the second image is displayed on panel 204.

When third light sources 201c emit light, the light from third light sources 201c is deflected by lens sheet 207, and is output toward the viewing position of the first image. This light passes as directional backlight through panel 204, and then arrives at the viewing position of the first image, namely right eye 105a of the viewer staying at the viewing assumed position, as shown in FIG. 12A. Thus, the first image (right-eye image) is seen by right eye 105a of the viewer.

When fourth light sources 201d emit light, the light from fourth light sources 201d is deflected by lens sheet 207, and is output toward the viewing position of the second image. This light passes as directional backlight through panel 204, and then arrives at the viewing position of the second image, namely left eye 105b of the viewer staying at the viewing assumed position, as shown in FIG. 12B. Thus, the second image (left-eye image) is seen by left eye 105b of the viewer.

When image display apparatus 200 is used "right-longitudinally" (not shown), detection unit 223 detects that the attitude of image display apparatus 200 is "right-longitudinal". Based on the detection result, control unit 221 controls panel 204 so that the first image and second image are displayed in the correct directions. Control unit 221 also controls light source unit 210 by inverting the light emission timings of third light sources 201c and fourth light sources 201d when the attitude of image display apparatus 200 is "left-longitudinal". Lenses 208 output the light emitted from fourth light sources 201d toward the viewing position (position of right eye 105a) of the first image, and output the light emitted from third light sources 201c toward the viewing position (position of left eye 105b) of the second image. Thus, similarly to the above-mentioned description, the first image (right-eye image) is seen by right eye 105a of the viewer, and the second image (left-eye image) is seen by left eye 105b of the viewer.

When image display apparatus 200 is used in the "inverted" state (not shown), detection unit 223 detects that the attitude of image display apparatus 200 is "inverted". Based on the detection result, control unit 221 controls panel 204 so that the first image and second image are displayed in the correct directions. Control unit 221 controls light source unit 210 by inverting the light emission timings of first light sources 201a and second light sources 201b when the attitude of image display apparatus 200 is "lateral". Lenses 208 output the light emitted from second light sources 201b toward the viewing position (position of right eye 105a) of the first image, and output the light emitted from first light sources 201a toward the viewing position (position of left eye 105b) of the second image. Thus, similarly to the above-mentioned description, the first image (right-eye image) is seen by right eye 105a of the viewer, and the second image (left-eye image) is seen by left eye 105b of the viewer.

[2-3. Effect or the Like]

Even when a viewer uses image display apparatus 200 having such a configuration after changing the orientation to any of "lateral", "left-longitudinal", "right-longitudinal", and "inverted", detection unit 223 detects that the attitude of image display apparatus 200, and, control unit 221 operates based on the detection result. Therefore, in light source unit 210, the light sources for the first image and the light sources for the second image are appropriately selected from first light sources 201a, second light sources 201b, third light sources 201c, and fourth light sources 201d in accordance with the attitude (orientation in use) of image display apparatus 200, and these light sources appropriately emits light in response to a display image.

Therefore, even when image display apparatus 200 is used in any orientation, the viewer who views an image for stereoscopic vision displayed on panel 204 from the viewing assumed position can three-dimensionally see the image for stereoscopic vision displayed on image display apparatus 200 with the naked eye without dedicated glasses. This is because, when a right-eye image is displayed, the light emitted from the light sources appropriately selected for the right eye enters right eye 105a of the viewer, and, when a left-eye image is displayed, the light emitted from the light sources appropriately selected for the left eye enters left eye 105b of the viewer.

In panel 204, each subpixel is formed in a substantially square shape. The width of the opening (region transmitting the backlight) of each subpixel in the X-axis direction is substantially equal to that in the Y-axis direction. Thus, when it is assumed that the sizes of pixels are equal to each other, the width of the opening of each subpixel in the travel direction of the directional backlight in panel 204 is about 1.5 times that in a panel including subpixels having the shape of FIG. 5A. Therefore, even when the resolution of panel 204 is increased and each subpixel is fined, a crosstalk can be prevented from occurring between the first image and second image, and a high-quality display image can be obtained.

This effect can be similarly obtained whether image display apparatus 200 is used "laterally" or "longitudinally".

Another Exemplary Embodiment

Thus, the first and second exemplary embodiments have been described as an example of a technology disclosed in the present application. However, the disclosed technology is not limited to these exemplary embodiments. The disclosed technology can be also applied to exemplary embodiments having undergone modification, replacement, addition, or omission. A new exemplary embodiment may be created by combining the components described in the first and second exemplary embodiments.

Another exemplary embodiment is described hereinafter.

The first exemplary embodiment has described the example where first light source 101a and second light source 101b are configured as shown in FIG. 2 so that line light sources such as cold cathode fluorescent lamps (CCFLs) are arranged in parallel with the Y axis so as to be along incident end surface 102a and incident end surface 102b. However, for example, as first light source 101a and second light source 101b, a plurality of point light sources such as LEDs may be arranged in the Y-axis direction so that the light is emitted toward incident end surface 102a and incident end surface 102b. Alternatively, another light source such as electroluminescence (EL) may be employed.

The first exemplary embodiment has described the example where each subpixel is formed in a rectangular shape whose long side is set in the X-axis direction as shown in FIG. 4. Each subpixel may be formed in a square shape where the length of the side in the X-axis direction is substantially equal to that in the Y-axis direction.

The second exemplary embodiment has described the configuration where detection unit 223 detects the attitude (orientation in use) of image display apparatus 200 and control unit 221 operates on the basis of the detection result. However, the configuration may be employed where the viewer specifies the attitude of image display apparatus 200 instead of the detection operation by detection unit 223, and control unit 221 operates on the basis of the specification, for example.

The first and second exemplary embodiments have described the example where the first image is set as a right-eye image and the second image is set as a left-eye image. However, the first image is set as a left-eye image and the viewing position of the first image is set as the position of left eye 105b, and the second image is set as a right-eye image and the viewing position of the second image is set as the position of right eye 105a, for example.

The second exemplary embodiment has described the configuration where light source unit 210 includes third light sources 201c and fourth light sources 201d. However, when it is obvious that the image display apparatus is used in a fixed attitude because of the largeness of the size or the like, the light source unit that does not include third light sources 201c and fourth light sources 201d may be employed. In this case, lens 208 of lens sheet 207 may be replaced with the other lens, for example, a cylindrical lens or the like having a semi-cylindrical shape that is extended in the Y-axis direction and curved in the X-axis direction.

The second exemplary embodiment has described the example where each of the light sources included in one set is formed of one point light source (e.g. one LED) as shown in FIG. 8A. However, each light source may be formed of a plurality of point light sources. Alternatively, one set of light sources may be substantially formed by optically isolating the light emitted by one point light source.

Figure 13:
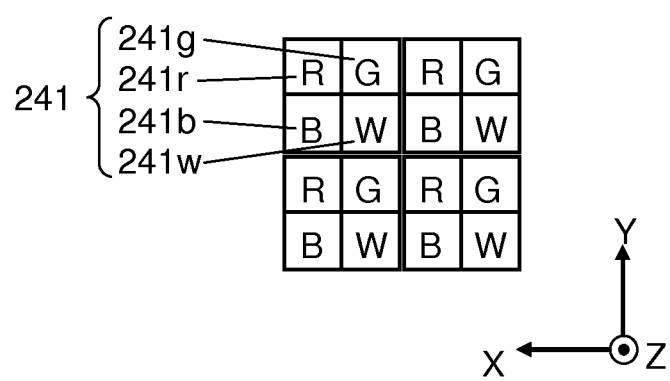
FIG. 13 is a partially enlarged view showing one configuration example of pixels in accordance with another exemplary embodiment.

The second exemplary embodiment has described the example where one pixel 241 is formed of red subpixel 241r, blue subpixel 241b, and two green subpixels 241g, as shown in FIG. 9. However, the second exemplary embodiment is not limited to this configuration. For example, one pixel may be formed of two red subpixels 241r, blue subpixel 241b, and green subpixel 241g by replacing one green subpixel 241g with one red subpixel 241r, or may be formed of red subpixel 241r, two blue subpixels 241b, and green subpixel 241g by replacing one green subpixel 241g with one blue subpixel 241b. FIG. 13 is a partially enlarged view showing one configuration example of pixels in accordance with another exemplary embodiment. For example, as shown in FIG. 13, one pixel 242 may be formed by arranging, in a 2×2 matrix, four subpixels: red subpixel 241r, blue subpixel 241b, green subpixel 241g, and white subpixel 241w that are formed in a substantially square shape. White subpixel 241w means a subpixel for transmitting white light of the backlight at a light quantity corresponding to the image signal. Alternatively, instead of white subpixel 241w, a subpixel for transmitting light of a color other than three primary colors, such as yellow light, may be used.

The second exemplary embodiment has described the example where detection unit 223 detects both of "left-longitudinal" and "right-longitudinal", but detection unit 223 may be configured to detect only one of "left-longitudinal" and "right-longitudinal", for example. Alternatively, detection unit 223 may be configured so that it does not detect "inverted".

An image display apparatus may be formed by combining panel 104 of the first exemplary embodiment with light source unit 210 and lens sheet 207 of the second exemplary embodiment.

The first and second exemplary embodiments have described the example where one of the right-eye image and left-eye image, which constitute an image for stereoscopic vision, is set as the first image and the other is set as the second image. However, the first image and second image may be independent of each other, or may be the same image. The first image and second image may be either of a still image and a moving image.

The specific numerical values of the first and second exemplary embodiments are simply one example of the exemplary embodiments. The present disclosure is not limited to these numerical values. Preferably, each numerical value is set at an optimal value in accordance with the specification or the like of the image display apparatus.

The present disclosure is applicable to an image display apparatus that displays a first image and a second image alternately. Specifically, the present disclosure is applicable to a liquid crystal television or the like that allows a viewer to three-dimensionally see an image for stereoscopic vision displayed on the image display surface with the naked eye.

What is claimed is:

1. An image display apparatus for displaying a first image and a second image alternately, comprising:
    a first light source for emitting light for displaying the first image;
    a second light source for emitting light for displaying the second image;
    a deflection unit for deflecting the light emitted from the first light source toward a previously assumed viewing position of the first image and deflecting the light emitted from the second light source toward a previously assumed viewing position of the second image; and
    a spatial light modulator including a plurality of pixels each of which includes a plurality of subpixels, and being configured to modulate the light having passed through the deflection unit based on a first image signal corresponding to the first image and a second image signal corresponding to the second image,
    wherein each of the subpixels is formed in a shape in which a length in a first direction is longer than or equal to a length in a second direction orthogonal to the first direction, the first direction being substantially parallel with a line connecting a viewing position of the first image to a viewing position of the second image, and
    wherein one of the pixels includes three of the subpixels, which are arranged in parallel with the second direction.

2. The image display apparatus according to claim 1, wherein the length in the first direction of each of the subpixels is set at 43 μm or more.

3. An image display apparatus for displaying a first image and a second image alternately, comprising:
    a first light source for emitting light for displaying the first image;
    a second light source for emitting light for displaying the second image;
    a deflection unit for deflecting the light emitted from the first light source toward a previously assumed viewing position of the first image and deflecting the light emitted from the second light source toward a previously assumed viewing position of the second image; and
    a spatial light modulator including a plurality of pixels each of which includes a plurality, of subpixels, and being configured to modulate the light having passed through the deflection unit based on a first image signal corresponding to the first image and a second image signal corresponding to the second image,
    wherein each of the subpixels is formed in a shape in which a length in a first direction is longer than or equal to a length in a second direction orthogonal to the first direction, the first direction being substantially parallel with an arrangement direction of the first light source and the second light source, one of the pixels includes four of the subpixels, which are arranged in a 2×2 matrix, and one of a right-eye image and a left-eye image is set as the first image and the other is set as the second image, the right-eye image and the left-eye image constituting a stereoscopic image, the image display apparatus further comprises a third light source for emitting light for displaying one of the first image and the second image, and a fourth light source for emitting light for displaying the other image, and the third light source and the fourth light source are arranged in a direction orthogonal to the arrangement direction of the first light source and the second light source.

4. The image display apparatus according to claim 3, wherein the length in the first direction of each of the subpixels is set at 43 μm or more.

5. The image display apparatus according to claim 3, further comprising a detection unit for detecting an attitude of the image display apparatus, wherein, based on the attitude detected by the detection unit, the image display apparatus selects a light emission by the first light source and the second light source or a light emission by the third light source and the fourth light source.

* * * * *